United States Patent
Khadhraoui et al.

(10) Patent No.: US 11,112,513 B2
(45) Date of Patent: Sep. 7, 2021

(54) METHOD AND DEVICE FOR ESTIMATING SONIC SLOWNESS IN A SUBTERRANEAN FORMATION

(71) Applicant: Schlumberger Technology Corporation, Sugar Land, TX (US)

(72) Inventors: Bassem Khadhraoui, Marseilles (FR); Saad Kisra, Abingdon (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 284 days.

(21) Appl. No.: 16/086,596

(22) PCT Filed: Mar. 21, 2017

(86) PCT No.: PCT/US2017/023296
§ 371 (c)(1),
(2) Date: Sep. 19, 2018

(87) PCT Pub. No.: WO2017/165341
PCT Pub. Date: Sep. 28, 2017

(65) Prior Publication Data
US 2019/0113639 A1    Apr. 18, 2019

(30) Foreign Application Priority Data
Mar. 25, 2016    (FR) ...................................... 1652596

(51) Int. Cl.
*G01V 1/28* (2006.01)
*G01V 1/50* (2006.01)
(Continued)

(52) U.S. Cl.
CPC ................ *G01V 1/282* (2013.01); *G01V 1/48* (2013.01); *G01V 1/50* (2013.01); *E21B 47/12* (2013.01);
(Continued)

(58) Field of Classification Search
CPC . G01V 1/282; G01V 1/48; G01V 1/50; G01V 2210/42; G01V 2210/47; G01V 2210/6161; G01V 2210/667; E21B 47/12
(Continued)

(56) References Cited

U.S. PATENT DOCUMENTS 5,081,611 A    1/1992 Hornby
6,205,087 B1 *  3/2001 Fukuhara ................. G01V 1/48
                                                           367/69
(Continued)

FOREIGN PATENT DOCUMENTS

GB          2424708 A       10/2006

OTHER PUBLICATIONS

Alford, Jeff, et al. "Sonic logging while drilling-shear answers." Oilfield Review 24.1 (2012). pp. 4-15. (Year: 2012).*
(Continued)

*Primary Examiner* — Kamini S Shah
*Assistant Examiner* — John E Johansen

(57) ABSTRACT

A method for estimating sonic slowness comprising: obtaining (700) a plurality of sonic waveforms are received by a plurality of receivers of a logging tool after emission of a source sonic wave by a transmitter, obtaining (710) slowness models of the subterranean formation, a slowness model being defined by a at least one cell of constant slowness for at least one wave energy mode, computing (720), for each slowness model, a set of candidate travel times, a candidate travel time of a set of candidate travel times being computed for a wave energy mode and a position of a receiver of the plurality of receivers, computing (730) a relevance indicator for each set of candidate travel times based on the recorded sonic waveforms; searching (740) a match between the sets of candidate travel times and the recorded sonic waveforms by searching a relevance indicator which is optimum, com-
(Continued)

puting (750) a sonic slowness estimate for the subterranean formation from a set of candidate travel times for which the relevance indicator is optimum.

18 Claims, 12 Drawing Sheets

(51) Int. Cl.
    *G01V 1/48*     (2006.01)
    *E21B 47/12*     (2012.01)

(52) U.S. Cl.
    CPC ...... *G01V 2210/42* (2013.01); *G01V 2210/47* (2013.01); *G01V 2210/6161* (2013.01); *G01V 2210/667* (2013.01)

(58) Field of Classification Search
    USPC .................................................. 703/6, 10
    See application file for complete search history.

(56) References Cited

U.S. PATENT DOCUMENTS

| | | | |
|---|---|---|---|
| 7,675,813 B2 * | 3/2010 | Valero | G01V 1/288 367/27 |
| 7,764,572 B2 | 7/2010 | Wu et al. | |
| 7,970,544 B2 | 6/2011 | Tang et al. | |
| 8,379,483 B2 * | 2/2013 | Tang | G01V 1/50 367/75 |
| 9,175,559 B2 | 11/2015 | Dowla et al. | |
| 2002/0183930 A1 * | 12/2002 | Plona | G01V 1/48 702/6 |
| 2004/0001389 A1 | 1/2004 | Tang | |
| 2006/0233047 A1 * | 10/2006 | Zeroug | G01V 1/44 367/25 |
| 2009/0168597 A1 | 7/2009 | Wu et al. | |
| 2012/0120767 A1 * | 5/2012 | Vu | G01V 1/50 367/31 |
| 2015/0036460 A1 | 2/2015 | Kinoshita et al. | |
| 2015/0081223 A1 * | 3/2015 | Williams | G01V 1/282 702/14 |

OTHER PUBLICATIONS

Akaike, "A new look at the statistical model identification," IEEE Transactions on Automatic Control, 1974, 19 (6): pp. 716-723.
Kimball et al. 1984, "Semblance processing of borehole acoustic array data," Geophysics vol. 49, No. 3, p. 274-281.
Kuperkoch et al., "Automated determination of P-phase arrival times at regional and local distances using higher order statistics," Geophysical Journal International 2009.
Schwarz, "Estimating the dimension of a model," Annals of Statistics vol. 6, No. 2, Mar. 1978, pp. 461-464.
Search Report for the equivalent French patent application 1652596 dated Feb. 23, 2017.
International Search Report and Written Opinion for the equivalent International patent application PCT/US2017/023296 dated Jun. 23, 2017.
International Preliminary Report on Patentability for the International patent application PCT/US2017/023296 dated Sep. 25, 2018.
Extended Search Report for the European patent application 17770937.5 dated Jan. 2, 2020.

* cited by examiner

METHOD AND DEVICE FOR ESTIMATING SONIC SLOWNESS IN A SUBTERRANEAN FORMATION

BACKGROUND

Sonic logging may be performed in a subterranean formation using a logging tool, for example a wireline tool and/or while drilling logging tool. A logging tool is placed in the subterranean formation (for example a borehole) and includes at least one transmitter for transmitting a reference sonic wave. The logging tool may include multiple receivers receiving and registering arrival sonic waves after propagation of the source wave through the subterranean formation. Sonic logging provides sonic data that may be used to characterize physical properties of the subterranean formation, such as properties of the rocks inside the subterranean formation. The sonic data may be used to estimate the sonic slownesses (e.g., inverse of velocity) in different parts of the subterranean formation. The slowness may be defined as an amount of time for a wave to travel a certain distance and may be measured in microseconds per foot.

A sonic slowness may be estimated using either motion detection algorithms or using semblance processing algorithms such as the Slowness Time Coherence (STC) algorithm.

A first motion detection algorithm is disclosed for example in U.S. Pat. No. 6,205,087 B1. This first motion detection algorithm operates on a single waveform basis by applying a waveform amplitude comparison with a given user defined amplitude threshold over a time window. When the waveform amplitude reaches for the first time, over the considered time window, the detection threshold, the corresponding time value is computed. The time values computed for the waveforms recorded for the different receivers of the logging tool may be compared one which each other's. False time values may be identified and rectified accordingly.

A second motion detection algorithm is described in document entitled "Improved first-motion algorithm to computed high resolution sonic log" by H P Valero, M. Tejada, D. Murray, 2004, Society of Petroleum Engineers, 90995. This algorithm operates on a single waveform basis. An energy criterion is applied to each single waveform to identify the waveform portion of arrival of the first wave component (P-wave component). After applying an energy criterion, a time window is defined to extract the waveform portion of interest. One or more criteria may be applied to the extracted waveform portions. As an example the Akaike Information Criterion (hereafter AIC) or the Bayes Information Criterion (hereafter BIC) are then applied to the extracted waveform portion in order to provide an estimate of the arrival time of the P-wave component of the considered waveform. The AIC operator is based on the detection of an energy change in a waveform but when it is used on a single waveform basis. The AIC operator has thus a high sensitivity to undesired early arrivals and may thus lead to false detection of arrival times.

When the waveforms recorded by the receivers of the logging tool have been processed, a statistical analysis may be applied to detect false arrival times and adjust the false arrival times. The detection of false arrival time may be performed either on a global basis by comparing the arrival times for different receivers taking into account the regular spacing of the receivers and/or on a single receiver basis.

An example STC algorithm is disclosed in the document entitled "Semblance processing of borehole acoustic array data", Geophysics, vol. 49, no 3, p 274-281, by C. V. Kimball and T. Marzetta, 1984. While motion detection algorithms rely on the estimate the arrival times for the P-wave components, the STC algorithm may estimate the velocity of multiple wave components (e.g. P-waves, S-waves, etc) of the arrival waves. The STC algorithm relies on a comparative analysis of multiple arrival waves received by regularly spaced receivers of a logging tool for a single firing of a source sonic wave by a transmitter of the logging tool. The STC algorithm identifies similarity (semblance analysis) between portions of the received waveforms taking into account the regular spacing of the receivers. The STC output is then provided to an automatic post-processing algorithm referred to as "slowness relabeling".

These algorithms may be not robust enough so that the slowness output log computed by the latter has to be quality controlled by users in order for example to detect erroneous detection of arrival time. When the quality of the recorded arrival waves is poor, for example because of acoustic noise in the borehole, users often proceed to the editing of the slowness log outputs based on the waveform semblance analysis.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter. Embodiments of the disclosure may include one or more devices, apparatus, systems, methods, computer program products, computer readable media.

According to yet other aspects, disclosed is a method for estimating sonic slowness including recording multiple sonic waveforms received by multiple receivers after emission of a source sonic wave by a transmitter through the subterranean formation to obtain multiple recorded sonic waveforms, the multiple receivers are located at different positions in the subterranean formation. The method further includes obtaining at least two slowness models of the subterranean formation, a slowness model being defined by a at least one cell of constant slowness; and computing, for each slowness model, a set of candidate travel times. A candidate travel time of a set of candidate travel times corresponds to a wave energy mode and a position of the receivers. The method further includes computing a relevance indicator for each set of candidate travel times based on the recorded sonic waveforms; searching a match between the sets of candidate travel times and the recorded sonic waveforms by searching the maximal relevance indicator; and computing a sonic slowness estimate for the subterranean formation from a set of candidate travel times for which the relevance indicator is maximal.

According to yet other aspects, disclosed is a computer program product or a computer readable medium including computer-executable instructions that when executed by a processor causes said processor to perform a method for estimating sonic slowness according to any embodiment disclosed herein.

According to yet other aspects, disclosed is a computing system including one or more processors for processing data; memory operatively coupled to the one or more processors that includes program instructions for causing said one or more processors to perform a method for estimating sonic slowness according to any embodiment disclosed herein.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
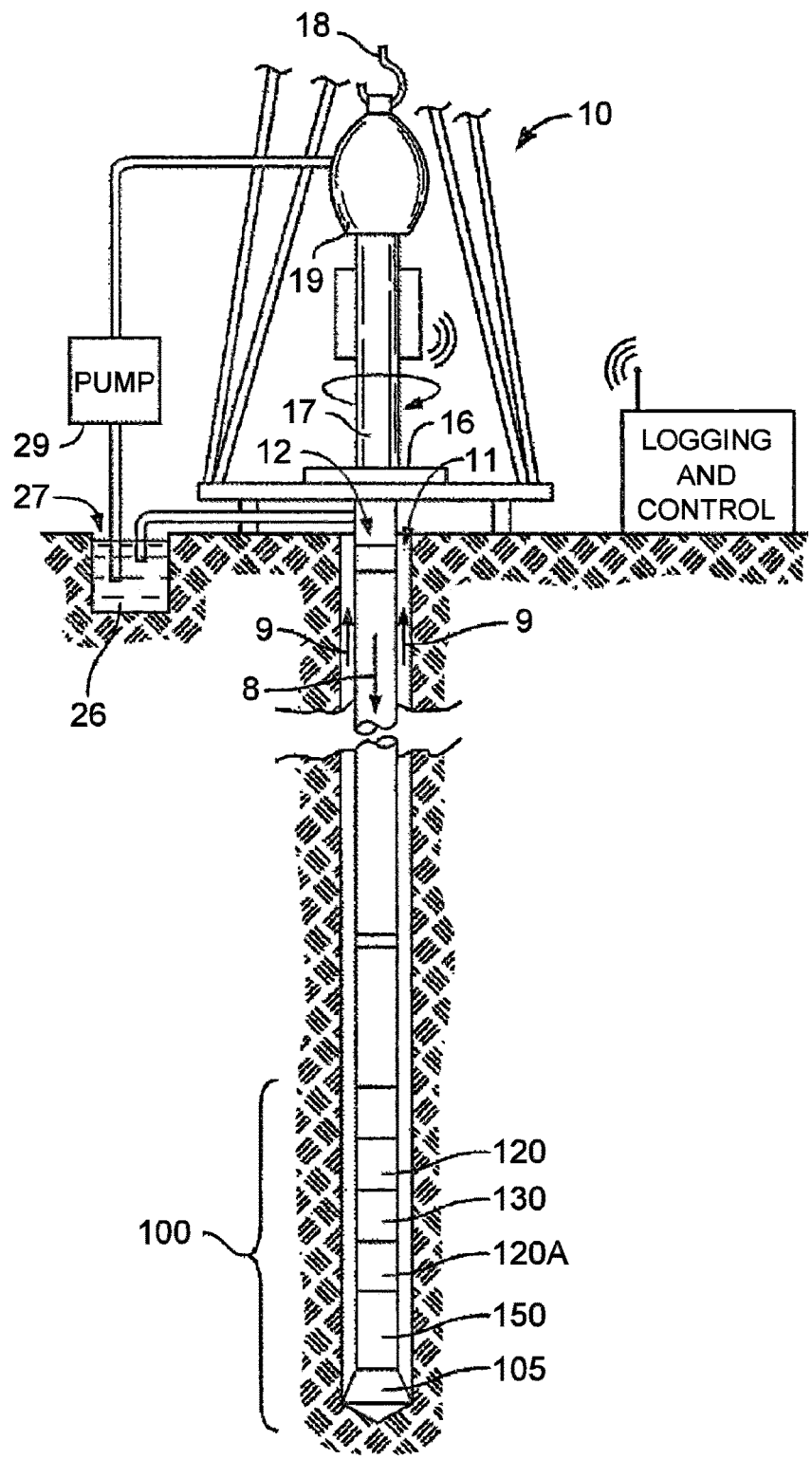
FIG. 1 illustrates a first embodiment of a system with a logging tool for generating sonic data.

The examples disclosed herein relate to the acquisition of sonic data for a subterranean formation and the analysis of these sonic data for characterizing physical (e.g. petrophysical, geophysical, mechanical, structural) properties of the subterranean formation, in order for example to enable accurate and/or reliable slowness estimation for at least one part of the subterranean formation.

The subterranean formation may be a natural formation or artificial formation. A subterranean formation is in an underground geological region. An underground geological region is a geographic area that exists below land or ocean. In one or more embodiments, the underground geological region includes the subsurface formation in which a borehole is or may be drilled and any subsurface region that may affect the drilling of the borehole, such as because of stresses and strains existing in the subsurface region. In other words, the underground geological region may not just include the area immediately surrounding a borehole or where a borehole may be drilled, but also any area that affects or may affect the borehole or where the borehole may be drilled.

One or more embodiments of the technology may be directed to slowness estimation for the formation around a borehole. A slowness estimate may be used to identify natural gas entry points in the borehole. A slowness estimate may also be used to estimate the porosity of a rock or of another material forming the borehole, to characterize the induced or natural anisotropies or orientations of the rock, to characterize the geomechanical properties of the rock in order for example to define a weight of fluid to be used while drilling the borehole. A slowness estimate may also be used to establish a time/depth relationship for the borehole, thus enabling a conversion of seismic data acquired for the borehole into depth data and to generate a cartography of the borehole properties.

One or more embodiments of the technology may be directed to real-time management of drilling operations. In particular, a drilling model is calibrated. Simulations are continually performed on using the calibrated drilling model. A predicted measurement value from the simulations is compared against an actual measurement value acquired from the field. If the actual measurement value matches the simulated measurement value, then the simulations may be used to determine a simulated state of the drilling operation. Based on the simulated state, a condition of the drilling operation is determined and one or more signals for controlling the drilling operations is performed.

One or more embodiments of the technology may be directed to a drilling simulation-based real time system for drilling operation monitoring, diagnostics and optimization. In particular, one or more embodiments may perform diagnostics and optimization for drilling. For example, one or more embodiments may perform real-time vibration mitigation, real-time rate of penetration (ROP) optimization, real-time trajectory monitoring and directional drilling recommendation, real-time borehole quality optimization, real-time logging while drilling/measurement while drilling (LWD/WMD) measurement quality assurance, real-time fatigue life monitoring, real-time bit-reamer load balancing, real-time bit and reamer wear monitoring, and real-time buckling and weight on bit (WOB) transfer monitoring. Trajectory monitoring may include ensuring that trajectory is within a threshold of the desired planned direction. Borehole quality is the degree of straightness of the hole. Fatigue life managing is managing stress on equipment, such as when rotating while drilling the hole.

FIG. 1 illustrates a wellsite system in which the examples disclosed herein can be employed. The wellsite can be onshore or offshore. In this example system, a borehole 11 is formed in subsurface formations by rotary drilling. However, the examples described herein can also use directional drilling, as will be described hereinafter.

A drill string 12 may be suspended within the borehole 11 and has a bottom hole assembly 100 that includes a drill bit 105 at its lower end. The surface system may include a platform and derrick assembly 10 positioned over the borehole 11. The assembly 10 may include a rotary table 16, a kelly 17, a hook 18 and a rotary swivel 19. The drill string 12 may be rotated by the rotary table 16. The rotatory table 16 may be energized by a device or system not shown. The rotary table 16 may engage the kelly 17 at the upper end of the drill string 12. The drill string 12 may be suspended from the hook 18, which is attached to a traveling block (also not shown). The drill string 12 may be positioned through the kelly 17 and the rotary swivel 19, which permits rotation of the drill string 12 relative to the hook 18. A top drive system may be used to impart rotation to the drill string 12. In this example, the surface system further includes drilling fluid or mud 26 stored in a pit 27 formed at the well site. A pump 29 delivers the drilling fluid 26 to the interior of the drill string 12 via a port in the swivel 19, causing the drilling fluid 26 to flow downwardly through the drill string 12 as indicated by the directional arrow 8. The drilling fluid 26 exits the drill string 12 via ports in the drill bit 105, and then circulates upwardly through the annulus region between the outside of the drill string 12 and the wall of the borehole 11, as indicated by the directional arrows 9. In this manner, the drilling fluid 26 lubricates the drill bit 105 and carries formation cuttings up to the surface as it is returned to the pit 27 for recirculation.

The bottom hole assembly 100 of the example illustrated in FIG. 1 includes a logging-while-drilling (LWD) module 120, a measuring-while-drilling (MWD) module 130, a roto-steerable system and motor 150, and the drill bit 105.

The LWD module 120 may be housed in a special type of drill collar and may include one or more logging tools. In some examples, the bottom hole assembly 100 may include additional LWD and/or MWD modules. The LWD module 120 may include capabilities for measuring, processing, and storing information, as well as for communicating with the surface equipment. The LWD module 120 may include a sonic measuring device.

The MWD module 130 may also be housed in a drill collar and may include one or more devices for measuring characteristics of the drill string 12 and/or drill bit 105. The MWD module 130 further may include an apparatus (not shown) for generating electrical power for at least portions of the bottom hole assembly 100. The apparatus for generating electrical power may include a mud turbine generator powered by the flow of the drilling fluid. However, other power and/or battery systems may be employed. In this example, the MWD module 130 includes one or more of the following types of measuring devices: a weight-on-bit measuring device, a torque measuring device, a vibration measuring device, a shock measuring device, a stick slip measuring device, a direction measuring device and/or an inclination measuring device.

Although the components of FIG. 1 are shown and described as being implemented in a particular conveyance type, the examples disclosed herein are not limited to a particular conveyance type but, instead, may be implemented in connection with different conveyance types including, for example, coiled tubing, wireline wired drill pipe and/or any other conveyance types known in the industry.

Figure 2:
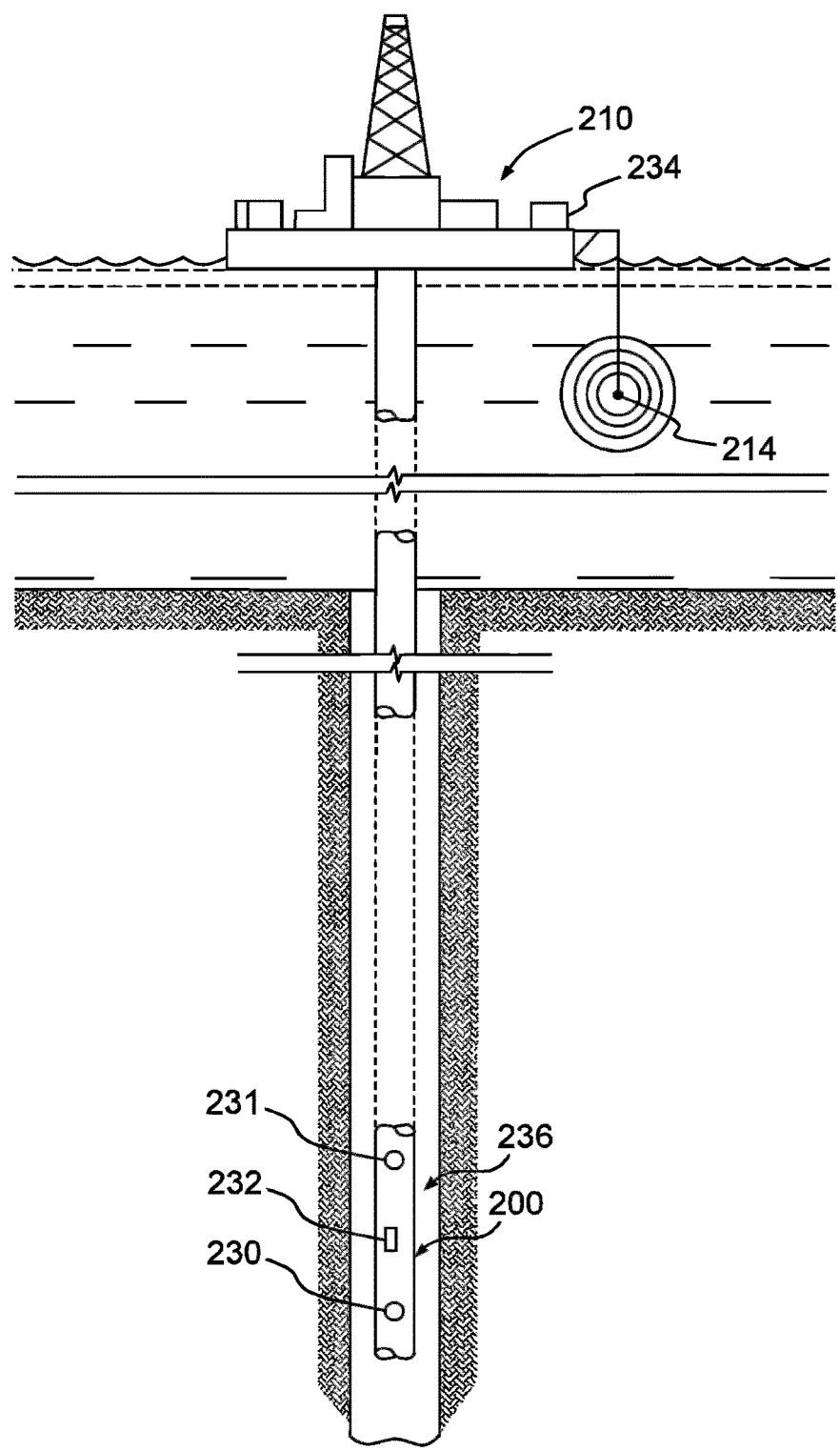
FIG. 2 illustrates a second embodiment of a system with a logging tool for generating sonic data.

FIG. 2 illustrates a sonic logging-while-drilling tool that can be used to implement the LWD tool 120 or may be a part of an LWD tool suite 120A. An offshore rig 210 having a sonic transmitting source or array 214 may be deployed near the surface of the water. In at least some embodiments, any other type of uphole or downhole source or transmitter may be provided to transmit sonic signals. In some examples, an uphole processor controls the firing of the transmitter 214.

Uphole equipment may also include acoustic receivers (not shown) and a recorder (not shown) for capturing reference signals near the source of the signals (e.g., the transmitter 214). The uphole equipment may also include telemetry equipment (not shown) for receiving MWD signals from the downhole equipment. The telemetry equipment and the recorder are may be coupled to a processor (not shown) so that recordings may be synchronized using uphole and downhole clocks. A downhole LWD module 200 includes at least acoustic receivers 230 and 231, which are coupled to a signal processor so that recordings may be made of signals detected by the receivers in synchronization with the firing of the signal source.

In operation, the transmitter 214 transmits signals and/or waves that are received by one or more of the receivers 230, 231. The received signals may be recorded and/or logged to generate associated waveform data. The waveform data may be processed by processors 232 and/or 234 to determine slowness values as disclosed herein.

Figure 3:
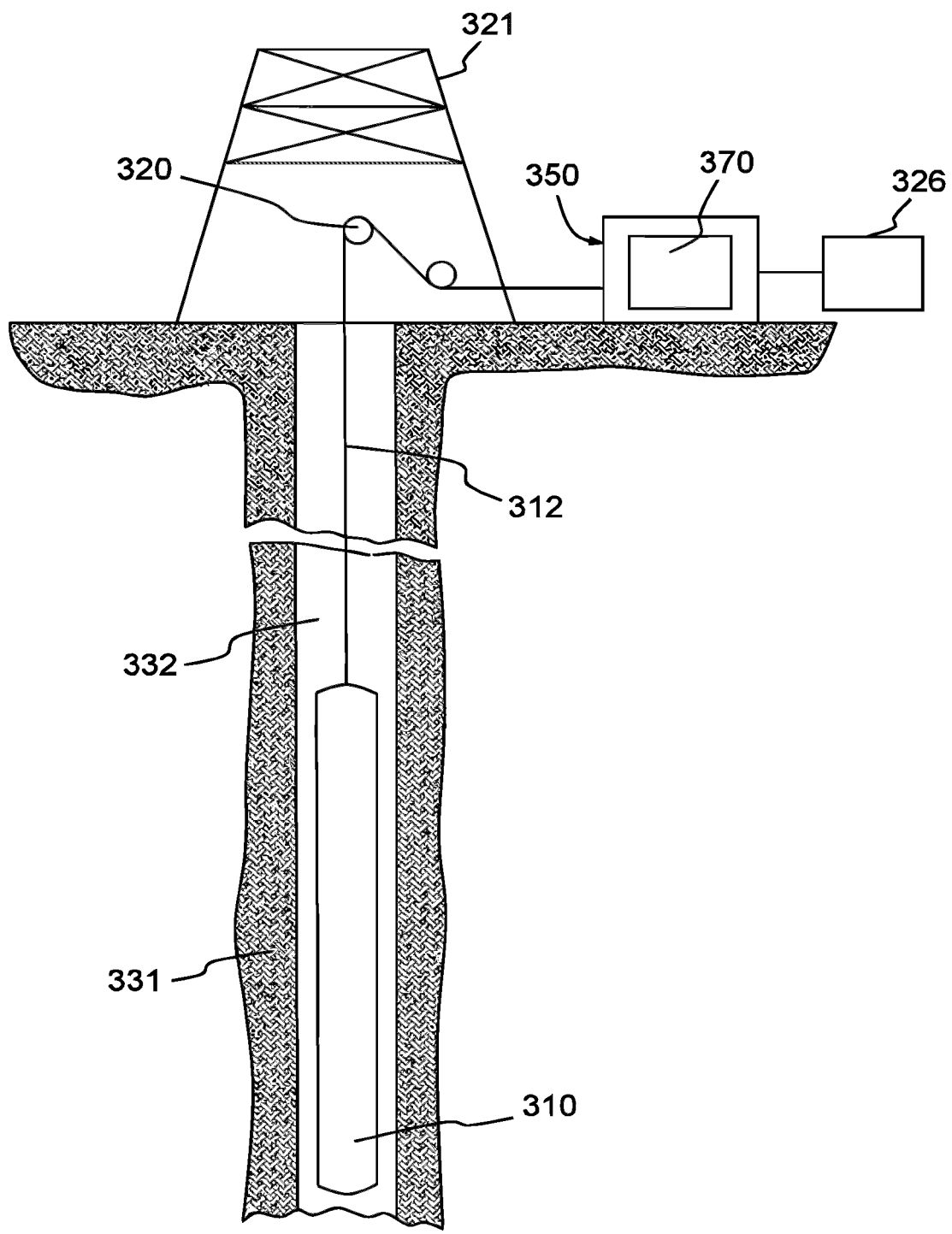
FIG. 3 illustrates a third embodiment of a system with a logging tool for generating sonic data.

FIG. 3 depicts an example an apparatus which can be used in implement the examples disclosed herein. In some examples, subsurface formations 331 are traversed by a borehole 332. The borehole 332 may be filled with drilling fluid and/or mud. In the illustrated example, a logging tool 310 is suspended on an armored cable 312 and may have optional centralizers. The cable 312 extends up the borehole 332, over a sheave wheel 320 on a derrick 321 to a winch forming part of surface equipment 350. A depth gauging apparatus may be provided to measure cable displacement over the sheave wheel 320 and the depth of the logging tool 310 in the borehole 332.

In some examples, a device is included in the logging tool 310 to produce a signal indicative of an orientation of the body of the logging tool 310. Processing and interface circuitry within the logging tool 310 amplifies, samples and/or digitizes the tool's information signals for transmission and communicates the signals to the surface equipment 350 via, for example, the cable 312. Electrical power and control signals for coordinating operation of the logging tool 310 are generated by the surface equipment 350 and communicated via the cable 312 to circuitry provided within the logging tool 310. The surface equipment includes a processor 370, peripheral equipment and/or a recorder 326.

The present description is made by reference to functions, engines, block diagrams and flowchart illustrations of the methods, systems, and computer program according to one or more example embodiments. Each described function, engine, block of the block diagrams and flowchart illustrations can be implemented in hardware, software, firmware, middleware, microcode, or any suitable combination thereof. If implemented in software, the functions, engines, blocks of the block diagrams and/or flowchart illustrations can be implemented by computer program instructions or software code, which may be stored or transmitted over a computer-readable medium, or loaded onto a general purpose computer, special purpose computer or other programmable data processing apparatus to produce a machine, such that the computer program instructions or software code which execute on the computer or other programmable data processing apparatus, create the means for implementing the functions described therein.

Embodiments of computer-readable media includes, but are not limited to, both computer storage media and communication media including any medium that facilitates transfer of a computer program from one place to another. Specifically, software instructions or computer readable program code to perform embodiments described therein may be stored, temporarily or permanently, in whole or in part, on a non-transitory computer readable medium of a local or remote storage device including one or more storage media.

As used herein, a computer storage medium may be any physical media that can be read, written or more generally accessed by a computer. Examples of computer storage media include, but are not limited to, a flash drive or other flash memory devices (e.g. memory keys, memory sticks, key drive), CD-ROM or other optical storage, DVD, magnetic disk storage or other magnetic storage devices, memory chip, RAM, ROM, EEPROM, smart cards, or any other suitable medium from that can be used to carry or store program code in the form of instructions or data structures which can be read by a computer processor. Also, various forms of computer-readable medium may be used to transmit or carry instructions to a computer, including a router, gateway, server, or other transmission device, wired (coaxial cable, fiber, twisted pair, DSL cable) or wireless (infrared, radio, cellular, microwave). The instructions may include code from any computer-programming language, including, but not limited to, assembly, C, C++, Basic, HTML, PHP, Java, Javascript, etc.

The computing system 100 may be implemented as a single hardware device, for example in the form of a desktop personal computer (PC), a laptop, a personal digital assistant (PDA), a smart phone or may be implemented on separate interconnected hardware devices connected one to each other by a communication link, with wired and/or wireless segments.

In one or more embodiments, the computing system 100 operates under the control of an operating system and executes or otherwise relies upon various computer software applications, components, programs, objects, modules, data structures, etc.

Figure 4A:
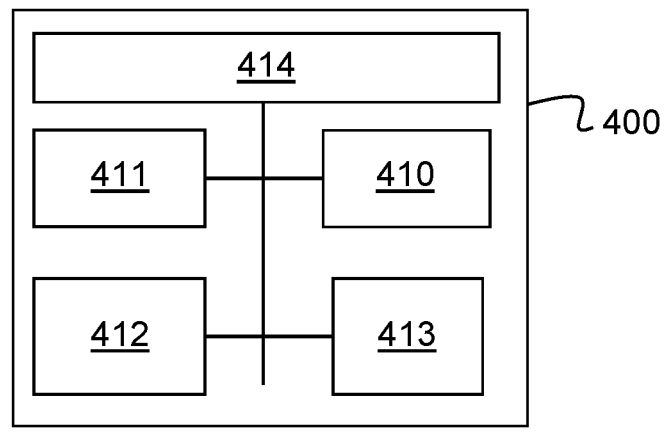
FIGS. 4A and 4B illustrate an example of an embodiment of a computing system for processing sonic data.

As illustrated schematically by FIG. 4A, the computing system 400 includes a processing unit 410, memory 411, one or more computer storage media 412, and other associated hardware such as input/output interfaces (e.g. device interfaces such as USB interfaces, etc., network interfaces such as Ethernet interfaces, etc.) and a media drive 413 for reading and writing the one or more compute storage media.

The memory 411 may be a random access memory (RAM), cache memory, non-volatile memory, backup memory (e.g., programmable or flash memories), read-only memories, or any combination thereof. The processing unit 410 may be any suitable microprocessor, integrated circuit, or central processing unit (CPU) including at least one hardware-based processor or processing core.

In one or more embodiments, the computer storage medium or media 412 includes computer program instructions which, when executed by the computing system 400, cause the computing system 400 to perform one or more method described herein. The processing unit 410 is a hardware processor that processes instructions. For example, the processing unit 410 may be an integrated circuit for processing instructions. For example, the processing unit may be one or more cores or micro-cores of a processor. The processing unit 410 of the computing system 400 may be configured to access to said one or more computer storage media 412 for storing, reading and/or loading computer program instructions or software code that, when executed by the processor, causes the processor to perform the blocks of a method described herein. The processing unit 410 may be configured to use the memory 411 when executing the blocks of a method described herein for the computing system 400, for example for loading computer program instructions and for storing data generated during the execution of the computer program instructions.

In one or more embodiments, the computing system 400 receives a number of inputs and outputs for communicating information externally. For interface with a user or operator, the computing system 400 generally includes a user interface 414 incorporating one or more user input/output devices, such as a touchscreen, keyboard, mouse, microphone, touchpad, electronic pen, or any other type of input device. Otherwise, user input may be received, e.g., over a network interface coupled to a communication network, from one or more external computer devices or systems.

Figure 4B:
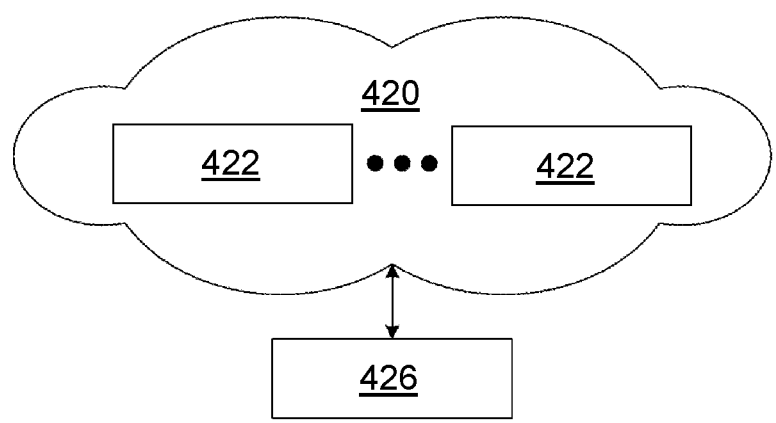

The computing system 400 in FIG. 4A may be connected to or be a part of a network. For example, as shown in FIG. 4B, the network 420 may include multiple nodes (e.g., node X 422, node Y 424). Each node may correspond to a computing system, such as the computing system shown in FIG. 4A, or a group of nodes combined may correspond to the computing system shown in FIG. 4A. By way of an example, embodiments may be implemented on a node of a distributed system that is connected to other nodes. By way of another example, embodiments may be implemented on a distributed computing system having multiple nodes, where each portion of one or more embodiments may be located on a different node within the distributed computing system. Further, one or more elements of the aforementioned computing system 400 may be located at a remote location and connected to the other elements over a network.

Although not shown in FIG. 4B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X 422, node Y 424) in the network 420 may be configured to provide services for a client device 426. For example, the nodes may be part of a cloud computing system. The nodes may include functionality to receive requests from the client device 426 and transmit responses to the client device 426. The client device 426 may be a computing system, such as the computing system shown in FIG. 4A. Further, the client device 426 may include and/or perform at least a portion of one or more embodiments.

The computing system 400 (FIG. 4A), a node X 422 or Y 424 (FIG. 4B) of a computing system or the surface equipment 350 (FIG. 3) may further include a data repository for storing sonic data, intermediate data and/or resultant data. A data repository is any type of storage unit and/or device (e.g., a file system, database, collection of tables, or any other storage mechanism) for storing data. Further, the data repository may include multiple different storage units and/or storage devices. The multiple different storage units and/or storage devices may or may not be of the same type or located at the same physical site and/or on the same physical device.

Figure 4C:
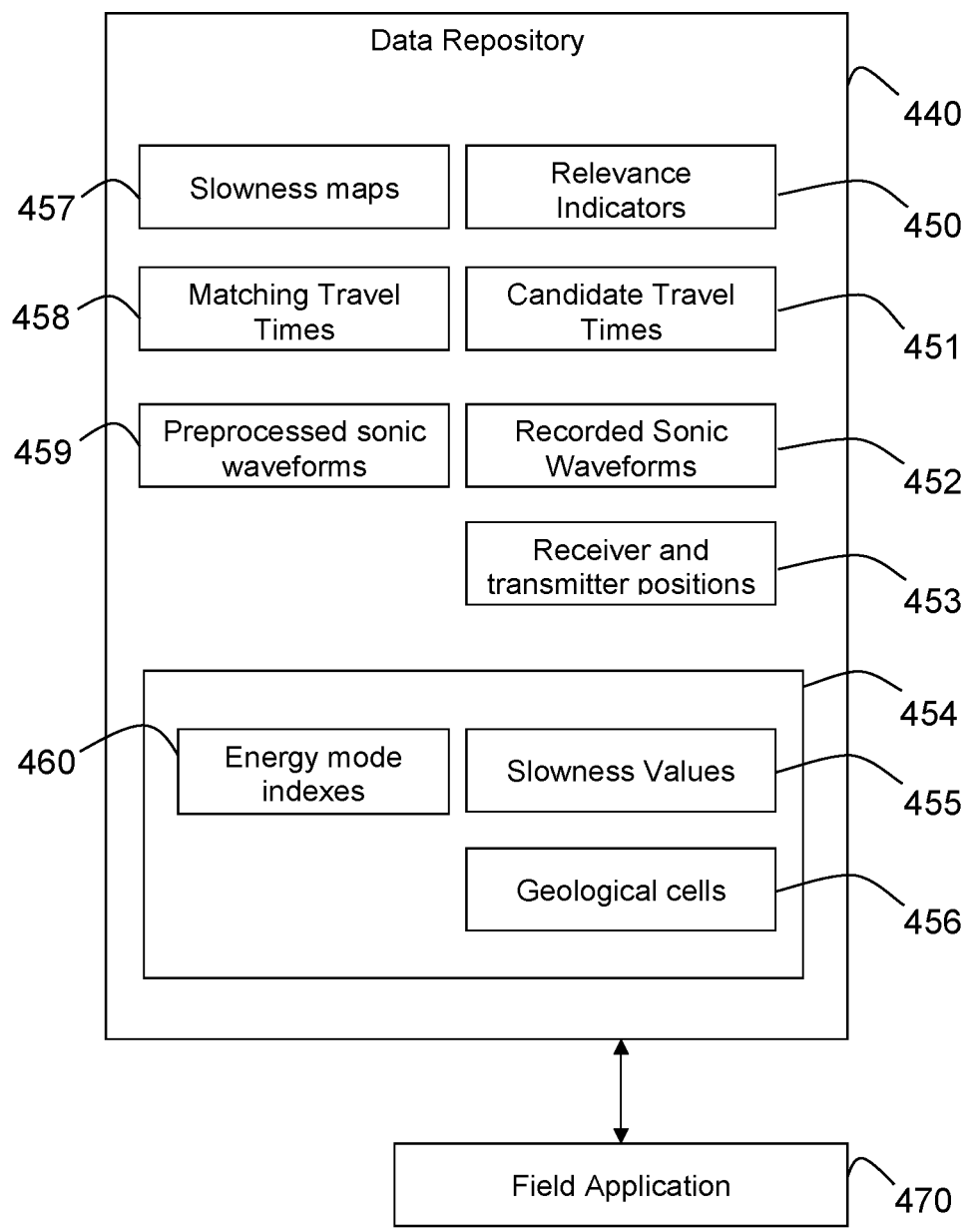
FIG. 4C illustrate an example system for processing sonic data.

FIG. 4C illustrates a system including a data repository 440 for storing sonic data and related data. The data repository 440 may be used for storing recorded sonic waveforms 452, preprocessed sonic waveforms 459, receiver and transmitter positions 453, slowness models 454, including geological cells 456, energy mode indexes 460 and slowness values 455. The data repository 440 may be used for storing other sonic related data, for example, relevance indicators 450, candidate travel times 451, matching travel times 458, slowness maps 457.

The data repository 440 may be operatively connected to a field application 470 for performing field operations and/or for implementing a method disclosed herein. The field application may be executed by a device operatively connected to a logging tool, for example by the computing system 400 (FIG. 4A), by one or more nodes X 422, Y 424 (FIG. 4B) of a computing system or by the surface equipment 350 (FIG. 3) or any other device for controlling a field operation.

Methods for processing sonic waveform data acquired for a subterranean formation will now be described in detail. The methods may be implemented by a device operatively connected to a logging tool 310, for example by the computing system 400 (FIG. 4A), by one or more nodes X 422, Y 424 (FIG. 4B) of a computing system or by the surface equipment 350 (FIG. 3) or any other device for controlling a field operation.

In one or more embodiment, the logging tool 310 includes one or more transmitters and one or more receivers. The different receivers may or may not be of the same type. More generally, in the present disclosure, the word "different" with respect to receivers is used to refer to receiver instances which may or may not be the same type.

Each transmitter of the logging tool is configured to emit a source sonic wave. A sonic wave may correspond to a sound wave in the frequency range of 1 to 25 kHz. The source wave is an oscillating wave, for example a sinusoidal wave. The transmitter may be a monopole transmitter or a dipole transmitter. With a monopole transmitter the energy of the source wave is emitted in each direction away from a center position, while a dipole transmitter emits energy in a particular direction. The emitted source wave may be received and recorded by the different receivers after propagation through the subterranean formation, i.e. after propagation through the borehole (e.g. through the fluid present in the borehole or through empty areas of the borehole) and/or after reflection on the walls of the borehole and/or after propagation along the borehole walls and/or after refraction through the walls of the borehole and propagation through solid materials of the subterranean formation (e.g. the rock or the materials in which the borehole is drilled). The direction of the wave propagation is perpendicular to the wavefront.

A wave received and recorded by a receiver may thus include different types of wave components depending on the propagation path followed by the source wave before arriving at the receiver. The received wave may for example include wave components like a P-wave component, a S-wave component, a Stoneley wave component, a mud wave component, a Rayleigh wave component, etc. For a given geologic material (e.g. a given rock, a given fluid), each of these wave components has a specific propagation speed. A P-wave (also called compressional wave) is an elastic wave which oscillates in the direction the wave propagates. A S-wave (also called shear-wave) is an elastic wave which oscillates perpendicular to the direction in which the wave propagates. A Stoneley wave is a wave that propagates along a solid/fluid interface, for example along the wall of a fluid-filled borehole. A P-wave may be produced by reflection on a wall of the borehole of a source wave. A P-wave or S-wave may be produced when a source wave propagates through a wall of the borehole of a source wave and enters in the subterranean formation in which the borehole is drilled while being refracted (the direction of propagation is changed when crossing the wall). A Rayleigh wave is a surface wave that travels near the surface of solid materials. A mud wave is a compressional wave transmitted by a fluid in a borehole.

When considering a single receiver, the different types of wave components produced by a source wave emitted by a transmitter after propagation through the subterranean formation arrive at the receiver at different arrival times. Thus the waveform recorded by this receiver has different types of waveform components. FIG. 5D illustrates this aspect. After emission of the source wave at time T0, the P-wave component arrives at time T1, the S-wave component arrives at time T2, the Rayleigh-wave component arrives at time T3, the mud wave component arrives at time T4 and the Stoneley wave component arrives at time T5. It is to be noticed that the different types of wave components may have different amplitudes, different frequencies or more generally different waveform attributes.

Each wave component corresponds to a given energy mode and a way the acoustic energy of a wave propagates in one or more directions. For example, a first energy mode E1 corresponds to the P-waves. A second energy mode E2 corresponds to the S-waves. A third energy mode E3 corresponds to the Stoneley waves.

In one or more embodiment, slowness models are used for estimating the slowness in a subterranean formation. The slowness model is a model of the slowness of sonic waves through a subterranean formation. A slowness model is used to predict the travel time of a sonic wave through a subterranean formation. A slowness model may predict travel time of one or more wave components/wave energy modes of sonic waves.

A slowness model $S_m$ may be defined by geological cells of constant slowness for a given energy mode/wave component. A geological cell has thus a constant slowness value for at least one energy mode/wave component. Without loss of generality, the slowness model may be defined such that each geological cell has a constant slowness value for each energy mode. Therefore the slowness model may be common to the various multiple energy modes. In at least some embodiments, a slowness model may be defined for a single energy mode and several slowness models may be defined for the several energy modes/wave components.

A geological cell may correspond to a volume area in the subterranean formation. Each geological cell may for example correspond to a given geological material or to an empty area. A geological cell may for example have the form of a three-dimensional (3D) parallelepipedic cell or any other suitable form. For each geological cell of a slowness model $S_m$ and for each energy mode $E_j$ a slowness value may be associated and stored in a memory, for example in the data repository 440.

For each slowness model $S_m$, a ray tracing technique may be used to model the propagation paths of the waves in the multiple geological cells of the subterranean formation. The ray tracing technique is based on ray paths representing the propagation paths of the different types of wave components and is usable for predicting or determining travel times or arrival time of the wave components at receivers after propagation along the represented propagation paths.

For simplification reasons, the time at which the firing of the source sonic wave occurs may be used as a time reference and arbitrary set to zero. Thus, the travel time of a wave component (i.e. the time period to travel from a transmitter to a given receiver) is equal to the arrival time (i.e. the time value or timestamp of the arrival of the wave component) of this wave component.

Figures 5A, 5B, 5C:
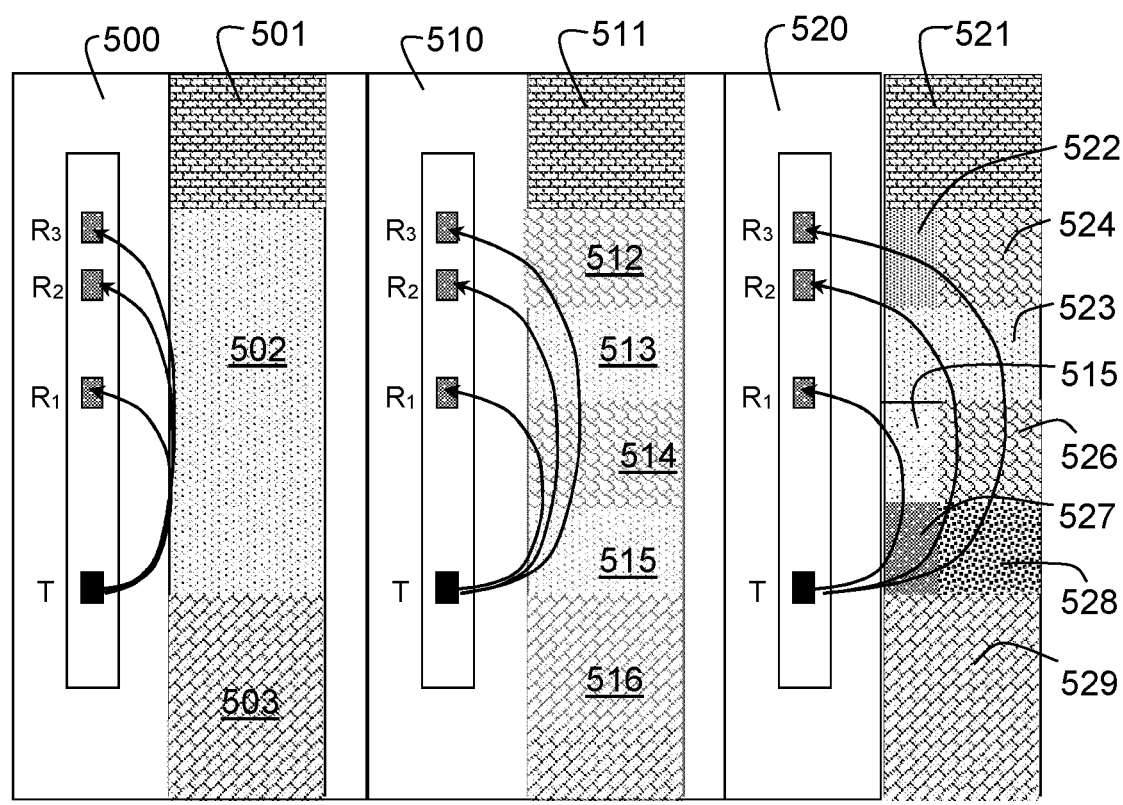
FIGS. 5A and 5C illustrate some aspects of the processing of sonic data.
Figure 5D:
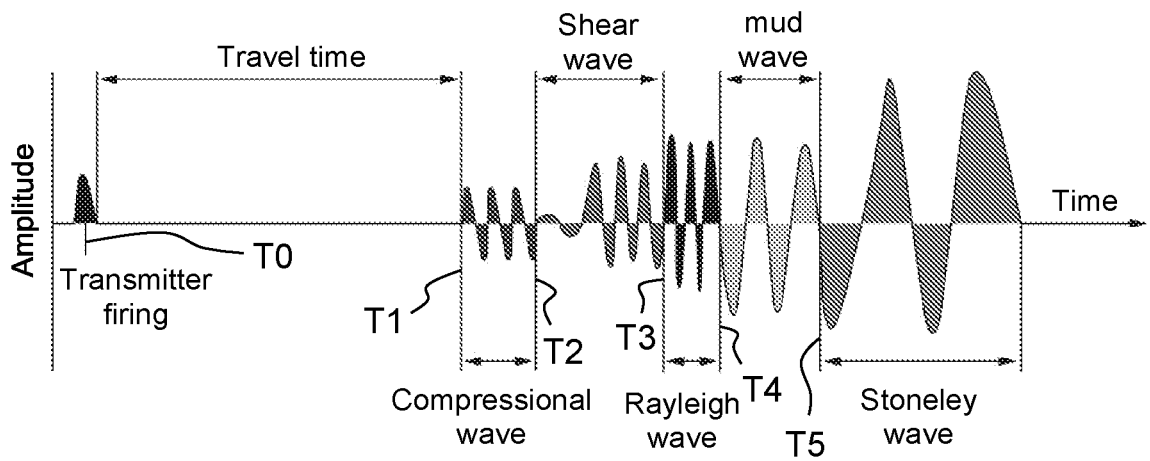
FIG. 5D illustrates some aspects of the processing of sonic waveforms.

FIGS. 5A to 5C illustrate several slowness models for a given subterranean formation in which a borehole is drilled.

The slowness model illustrated by FIG. 5A corresponds to a slowness model with four geological cells 500-503, the geological cell 500 corresponding to the borehole itself, including for example a fluid, and the geological cells 501-503 corresponding to different types of rocks or materials forming the subterranean formation in which the borehole is drilled. With this first slowness model, according to a ray tracing technique, a wave emitted by the transmitter T propagates through the geological cell 500 and are then reflected back by the wall of the borehole at the level of the geological cell 502 and/or propagates along the wall of the borehole at the interface between the geological cell 500 and the geological cell 502 and finally propagates again through the geological cell 500 before reaching one of the receivers R1 to R3.

The slowness model illustrated by FIG. 5B corresponds to a slowness model with seven geological cells 510-516, the geological cell 510 corresponding to the borehole itself, including for example a fluid and the geological cells 511-516 corresponding to different types of rocks or materials forming the subterranean formation in which the borehole is drilled. With this second slowness model, according to a ray tracing technique, a wave emitted by the transmitter T propagates through the geological cell 510, is refracted by the wall of the borehole at the interface between the geological cell 510 and the geological cell 515, is transmitted successively through one or more geological cells 515, 514, 513 and/or 512, is refracted again by the wall of the borehole at the interface between the geological cell 510 and one of the geological cells 512, 513 or 514, and finally propagates again through the geological cell 510 before reaching one of the receivers R1 to R3.

The slowness model illustrated by FIG. 5C corresponds to a slowness model with ten geological cells 520-529, the geological cell 520 corresponding to the borehole itself, including for example a fluid and the geological cells 521-529 corresponding to different types of rocks or materials forming the subterranean formation in which the borehole is drilled. With this third slowness model, according to a ray tracing technique, a wave emitted by the transmitter T propagates through the geological cell 520, is refracted by the wall of the borehole at the interface between the geological cell 520 and the geological cell 528, is transmitted successively through one or more geological cells 527, 528, 525, 526, 524, 522 and/or 523, is refracted again by the wall of the borehole at the interface between the geological cell 520 and one or the geological cells 522, 524, 525 or 527, and finally propagates again through the geological cell 520 before reaching one of the receivers R1 to R3.

Using a slowness model having geological cells of constant slowness for a given wave component enables the computation of the travel time of a wave component in a given geological cell of the slowness model on the basis of the slowness value associated to the given geological cell and of the length of the portion of the propagation path inside the given geological cell. A travel time for a given wave component between a transmitter at a given position and a receiver at a given position may then be computed for each propagation path by summing up the different travel times in the different geological cells computed for the different portions of the propagation path. For each slowness model, a travel time may thus be computed, for a given transmitter position, for a given receiver position and a given wave component.

Figure 6:
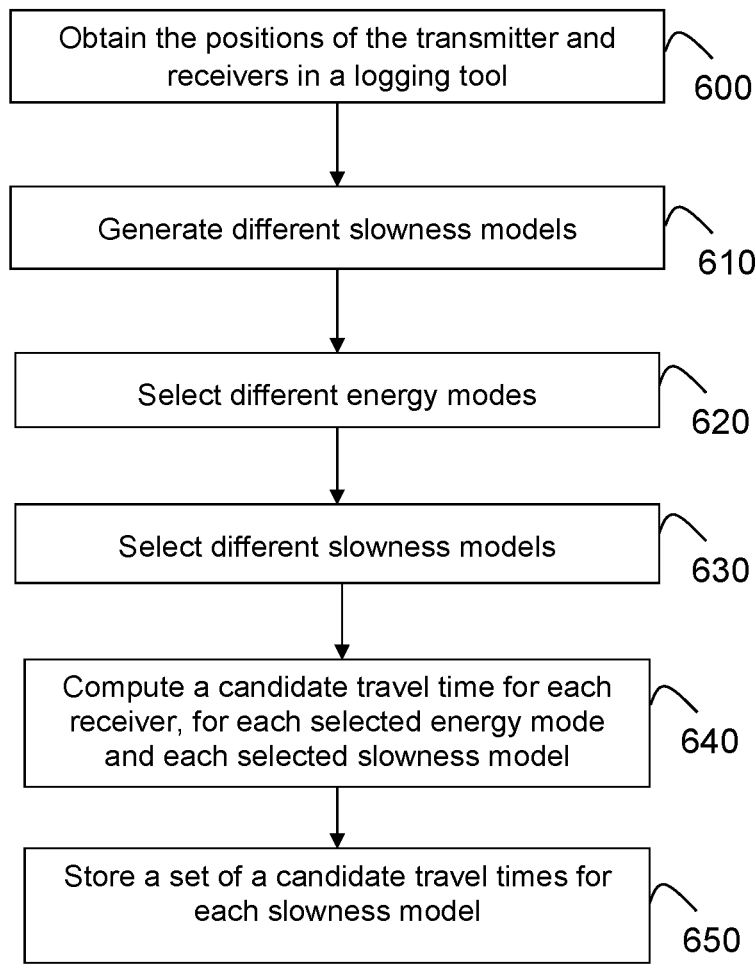
FIG. 6 illustrates an example of a flowchart of a method for processing of sonic data.

FIG. 6 show a flowchart in accordance with one or more embodiments of a method for processing sonic data acquired for a subterranean formation. While the various blocks in the flowchart are presented and described sequentially, one of ordinary skill will appreciate that at least some of the blocks may be executed in different orders, may be combined or omitted, and at least some of the blocks may be executed in parallel. In at least one embodiment, the method may be performed by the computing system 400 (FIG. 4A), by one or more nodes X 422, node Y 424 (FIG. 4B) of a computing system or by the surface equipment 350 (FIG. 3) operatively connected to a logging tool, for example the logging tool 310, or by any other device for controlling a field operation. In the example embodiment described by reference to FIG. 6, the subterranean formation includes a borehole.

The method described by reference to FIG. 6 will be referred to below as the forward modelling. This forward modelling is applicable for any configuration of receivers, i.e. whether the receivers are regularly spaced in the logging tool or irregularly spaced in the logging tool.

At block 600, the positions of at least one transmitter and one or more receiver of a logging tool placed in the borehole are obtained. The position of a transmitter or receiver may be defined in a one-dimensional (1D) space corresponding to a straight line of the logging tool along which the transmitter and the receivers are placed. When the logging tool is placed vertically in the borehole, the position of a transmitter or a receiver may be defined as a depth value d in the borehole. For example one transmitter and N=4 receivers are used. Assuming the logging includes one transmitter the transmitter position is noted T(d) where d is the depth of the transmitter. Similarly a receiver position is noted $R(d_n)$ where n is an integer value that varies from 1 to N=4. The distance TR between a receiver at position $R(d_n)$ and the transmitter at position T(d) is thus $TR=|d_n-d|$.

At block 610, several slowness models are generated for the subterranean formation. For each slowness model, a set of geological cells of constant slowness value are defined. A slowness value associated to the geological cell for each possible energy mode is stored in memory, for example in the data repository 440.

At block 620, one or more energy modes and/or wave components are selected from the energy modes/wave components used in the slowness models generated at block 610. For example three energy modes $E_1$ to $E_3$ are selected that correspond respectively to three wave components: the P-wave component, the S-wave component and the Stoneley wave component. An energy mode index j=1 to 3 is associated to each energy mode $E_j$.

At block 630, several slowness models are selected from the set of generated slowness models. For example, M=10 slowness models are selected. A model index m=1 to M is associated to each slowness model $S_m$.

At block 640, for each slowness model selected at block 630 and each energy mode selected at block 620, a travel time is computed for each receiver position received at block 600, taking into account the transmitter position. Therefore, for a given slowness model, a set of travel times are computed, where each travel time corresponds to an energy mode and a position of a receiver of the logging tool.

At block 650, each of the travel times computed at block 640 are stored in a memory, for example in the data repository 440, in association with a slowness model index m, an energy mode index j, a receiver position $R(d_n)$ for a receiver index n and a transmitter position T(d). A travel time computed for a slowness model index m, an energy mode index j, a receiver position $R(d_n)$ and a transmitter position T(d) will be noted:

$$TT\ s_m^{E_j}(T(d),R(d_n))$$

Figure 7A:
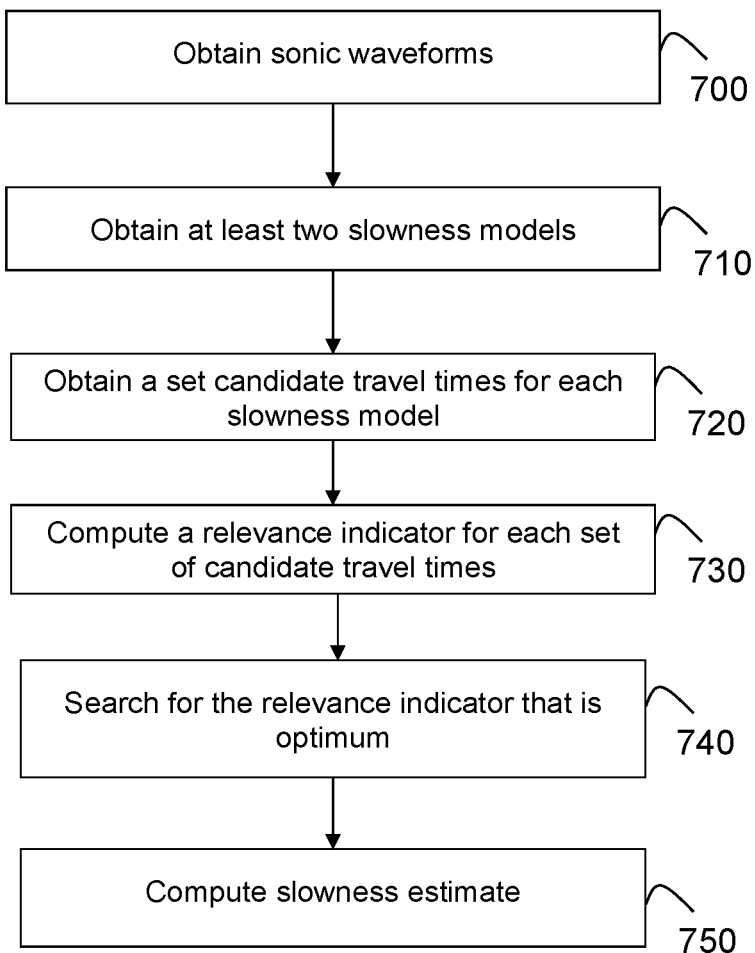
FIGS. 7A and 7B illustrate an example of a flowchart of a method for estimating sonic slowness.

FIG. 7A shows a flowchart in accordance with one or more embodiments of a method for estimating slowness for a subterranean formation. While the various blocks in the flowchart are presented and described sequentially, one of ordinary skill will appreciate that at least some of the blocks may be executed in different orders, may be combined or omitted, and at least some of the blocks may be executed in parallel. In at least one embodiment, the method may be performed by a device operatively connected to a logging tool, for example by the computing system 400 (FIG. 4A), by one or more nodes X 422, node Y 424 (FIG. 4B) of a computing system, by the surface equipment 350 (FIG. 3) or by any other device for controlling a field operation.

At block 700, sonic waveforms received by receivers after emission of a source sonic wave by a transmitter through the subterranean formation are obtained. The receivers are located at different positions in the subterranean formation. The sonic waveforms may be obtained directly or indirectly from the receivers. For example, the sonic waveforms may be obtained from the sensors and stored in the data repository. The sonic waveforms may then be obtained from the data repository.

At block 710, one or more slowness models of the subterranean formation are obtained. A slowness model may be defined by one or more cells of constant slowness for one or more wave energy modes. For example, the slowness models may be obtained from the data repository 440. The slowness models may be defined for one or more energy modes of sonic waveforms.

At block 720, a set of candidate travel times is computed for each slowness model obtained at block 710. A candidate travel time of a set of candidate travel times is computed for a wave energy mode and a position of a receiver of the multiple receivers.

At block 730, a relevance indicator for each set of candidate travel times is computed on the basis of the obtained sonic waveforms.

At block 740 a match between the sets of candidate travel times and the recorded sonic waveforms is searched by searching a relevance indicator that is optimum.

At block 750 one or more slowness estimates are computed for the subterranean formation from a set of candidate travel times for which the relevance indicator is optimum.

Figure 7B:
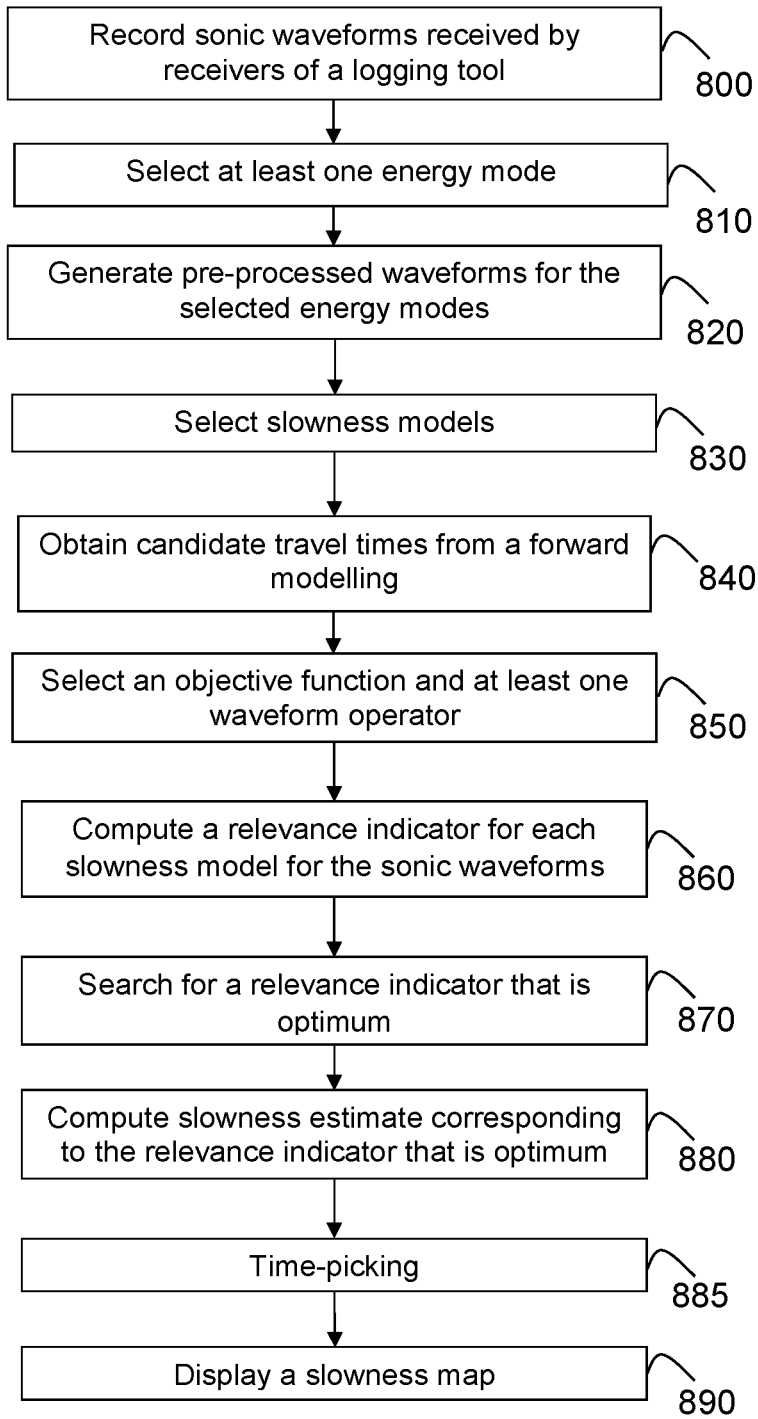

FIG. 7B shows a flowchart in accordance with one or more embodiments of a method for estimating slowness for a subterranean formation on the basis of waveform data recorded by the receivers of a logging tool. While the various blocks in the flowchart are presented and described sequentially, one of ordinary skill will appreciate that at least some of the blocks may be executed in different orders, may be combined or omitted, and at least some of the blocks may be executed in parallel. In at least one embodiment, the method may be performed by a device operatively connected to a logging tool, for example, by the computing system 400 (FIG. 4A), by one or more nodes X 422, node Y 424 (FIG. 4B) of a computing system, by the surface equipment 350 (FIG. 3) or by any other device for controlling a field operation.

In the example embodiment described by reference to FIG. 7B, the subterranean formation is the same as the one considered for the forward modelling. In addition, the logging tool is the same and the receiver and transmitter positions used for the forward modelling.

The travel times stored at block 650 are used as candidate travel times for the slowness estimation on the basis of waveform data recorded by the receivers. The slowness estimation is performed according to a method that will now be described by reference to FIG. 7B. For real-time purposes, the forward modelling may be performed in advance in order to be ready for the processing of first waveform data recorded by the receivers. According to another example, the forward modelling may be updated on the basis of the result of the slowness estimation performed on the basis of the waveform data recorded by the receivers and the updated candidate travel times used for estimating slowness values for the subterranean formation on the basis of second waveform data newly recorded by the receivers.

At block 800, a source wave is emitted by a transmitter of a sonic logging tool at a depth d and waves are received by the N receivers of the sonic logging tool at depth $d_n$ where n is an integer value that varies from 1 to N are recorded. The sonic logs generated by the sonic logging tool include waveform data representing a sonic wave received by a receiver. Each receiver n records at least one waveform noted $wf_n$. The waveform data may include data representing monopole P-waves and S-waves, dipole flexural waves and/or monopole Stoneley waves, for example. The waveform data may be obtained while drilling (FIG. 1) and/or via wireline (FIG. 2.) using a multimode sonic tool. Monopole waveform data, dipole waveform data, quadrupole waveform data, pseudo-Rayleigh waveform data, and Stoneley waveform data may be obtained from the sonic logs.

The waveform data representing the recorded sonic waveforms 452 may be stored in the data repository 440, or be directly sent through a communication link to a device operatively connected to a logging tool 310 or to a data repository 440. Multiple sonic waveforms may then be obtained for the multiple receivers. For example, the multiple sonic waveforms may be read or obtained from the data repository 440, received by a field application 470 operatively connected to the data repository or to a logging tool, received by the computing system 400 (FIG. 4A), by one or more nodes X 422, node Y 424 (FIG. 4B) of a computing system or by the surface equipment 350 (FIG. 3).

At block 810, one or more energy modes are selected. The number of selected energy modes is noted P. For example P=3 and three energy modes $E_1$, $E_2$, $E_3$ are chosen which correspond respectively to the P-waves, the S-waves and the Stoneley waves. The selected energy modes and corresponding wave components used for slowness estimation may include the energy modes/wave components selected at block 620 in the forward modelling or a subset thereof. The selection may be performed manually by a user or automatically from the set of energy modes selected at block 620 in the forward modelling. According to another example, P=1 for slowness estimation on monopole data of P-waves or for slowness estimation on dipole data of S-waves.

At block 820, a pre-processing is performed on the waveform data. This pre-processing operation is optional. It improves the performance of the slowness estimation method. For each energy mode selected at block 810, a pre-processing specific to that energy mode is applied to each recorded waveform. Each waveform component corresponding to a wave component may have specific characteristics that the other waveform components do not have: a specific amplitude, a specific frequency spectrum or other specific waveform attribute. Thus pre-processing performed for a given energy mode on a recorded waveform may be performed on the basis of one or more criteria (amplitude, amplitude standard deviation, frequency band, or others criteria which may be extracted from a waveform) so as to extract from the processed waveforms a given wave component, and therefore mitigate (e.g., reduce or eradicate) the other waveform components that do not have the known specific characteristic(s) of the given energy mode. A pre-processed waveform, resulting from a pre-processing of the waveform $wf_n$ received by receiver n that extracts the waveform component corresponding to the energy mode Ej, will be noted $wf_R^{Ej}$.

For example, as illustrated by FIG. 5D, the Stoneley wave component has an amplitude which is higher than the other waveform components and a lower frequency. Therefore by filtering a recorder waveform so as to extract—by means for example of a low pass filter—the Stoneley wave component, the other waveform components of lower amplitude and/or of higher frequency are mitigated.

According to another example illustrated by FIG. 5D, the Rayleigh wave component has a frequency which is higher than the other waveform components. Therefore by filtering a recorder waveform so as to extract—by means for example of a high pass filter—the Rayleigh wave component, the other waveform components of lower frequency are mitigated.

According to another example illustrated by FIG. 5D, the P-wave component has an amplitude which is much lower than the other waveform components. Therefore by filtering a recorder waveform so as to extract—by means for example of an amplitude filter—the P-wave component, the other waveform components of higher amplitude are mitigated.

At block 830, one or more slowness models are selected. The selected slowness models used for slowness estimation may include the slowness models selected at block 630 in the forward modelling or a subset thereof. The selection may be performed manually by a user or automatically from the set of slowness models selected at block 630 in the forward modelling.

At block 840, the travel times computed for the slowness models selected at block 830 and or the energy modes selected at block 810 are obtained for example from the data repository 440 in which the travel times have been stored at block 650 during forward modelling. These travel times are used as candidate travel time for the slowness estimation. For each slowness model $S_m$, a set of N*P candidate travel times is thus obtained, where N is the receiver number for which waveform data are available and P the number of energy modes selected at block 810. A candidate travel time computed for a slowness model $S_m$, an energy mode $E_j$, a receiver position $R(d_n)$ and a transmitter position $T(d)$ is noted:

$$TT\, s_m^{E_j}(T(d),R(d_n))$$

where j varies from 1 to P, n varies from 1 to N and m varies from 1 to M.

At block 850, an objective function is selected. The selection may be performed manually by a user or automatically from a set of available objective functions. An objective function is a function that is applied to a set of candidate travel times of a given slowness model and to a set of waveforms (with the preprocessing according to block 820 or without the preprocessing) recorded by one or more receivers so as to generate a relevance indicator for the given slowness model. The relevance indicator of a slowness model is also referred to therein as the model relevance indicator.

The purpose of the objective function is to provide a numerical tool for automatically identifying which slowness model best matches with a set of recorded waveforms. A model relevance indicator is generated on the basis of the candidate travel times computed for that given slowness model and by comparison with the recorded waveforms (whether preprocessed or not). The model relevance indicator is a numerical value that is globally assigned to the given slowness model considered as a whole and represent a level of relevance of this slowness model.

In one or more embodiments, the objective function is configured to take into account several energy modes for the waveforms recorded by the various receivers of the logging tool. The objective function is an analysis tool that is much more robust to erroneous detection of an arrival time compared to a waveform operator applied to a single waveform and a single energy mode.

In one or more embodiments, the objective function relies on the application of a non-linear Radon transform to waveform attributes computed by means of one or more waveform operators.

In one or more embodiments, the objective function relies on one or more waveform operators that operate on a single waveform basis. A waveform operator may be applied on a single recorded waveform to compute an operator output value representing a relevance indicator for a given candidate travel time computed for a given receiver and a given energy mode. The relevance indicator of a candidate travel time is also referred to therein as the travel time relevance indicator.

The waveform operator is selected in such a way that the travel time relevance indicator or operator output value is optimum for a candidate travel time which, for a given waveform, is the best candidate travel time under a given criteria represented by the waveform operator itself. An operator output value for a candidate travel time is optimum for example if the operator output value reaches a maximum, a minimum or verify an optimality criteria for the candidate travel time.

The objective function defines how the travel time relevance indicators are numerically combined to generate the model relevance indicator. The model relevance indicator of a given slowness model is a numerical combination of the travel time relevance indicators of the candidate travel times computed for the given slowness model. The numerical combination defined by the objective function may rely on a sum, a weighted sum, a multiplication, a weighted multiplication or any mathematical function that combines the travel time relevance indicators in such a way that the output of the objective function (i.e. the model relevance indicator) increases when any of the travel time relevance indicator increases. Examples of objective functions and waveform operators are described below.

The waveform operator may be the so called "Short Term Average/Long Term Average" (hereafter STALTA) operator, the "Akaike Information Criterion" (hereafter AIC), the "Bayes Information Criterion" (hereafter BIC) or a high-order statistics operators. The STALTA operator may be defined on the basis of a positive function g(t) applicable to a waveform. For example the function g(t) may extract the Hilbert envelop of the waveform or a squared waveform amplitude. In the below equation (eq1), t is a candidate travel time for which the operator output value/travel time relevance indicator is computed, sw and lw define a temporal window around the candidate travel time t, and ε is a small real number used for the purposes of the stabilization of the division process:

$$STALTA_g(t) = \frac{lw}{sw} \cdot \frac{\int_t^{t+sw} g(u)\cdot du}{\varepsilon^2 + \int_{t-lw}^{t} g(u)\cdot du} \quad (eq1)$$

where u is a variable that represents the time.

The timestamp or time value t at which the STALTA function reaches a maximum over a temporal zone of interest is often considered to be the arrival time of the energy mode of interest. The STALTA function presents a peak around that time value. The STALTA operator is widely used in global seismology data processing for the computation of arrival times of P-wave and S-wave. According to the equation (eq1) above, the operator output value is computed from a portion of the recorded sonic waveform corresponding to a temporal window [t−lw, t+sw] defined relatively to the given candidate travel time t.

The AIC operator is defined for example in the document entitled "A new look at the statistical model identification", by Akaike H., 1974, IEEE Transactions on Automatic Control, 19 (6), p 716-723. The AIC operator aims at detecting changes in a recorded waveform and the AIC operator output increases notably when a change is detected. The most noticeable change observed in the AIC output is often associated to the arrival time of the first energy mode, e.g. the arrival of the P-wave component.

The Bayes Information Criterion is defined for example in the document entitled "Estimating the dimension of a model", by Schwarz G. E., 1978, Annals of Statistics 6.

In one or more embodiment, the objective function is called the CSM function (CSM, for Combined Sonic Mapping) and is defined by equation (eq2) below:

$$CSM_{Op}(s_m^{E_1}, s_m^{E_2}, \ldots, s_m^{E_P}) = \qquad (eq2)$$

$$\sum_n K_n \cdot \left[ \prod_{j=1}^P Op_{wf_R^{E_j}}\left(TT_{s_m^{E_j}}(T(d), R(d_n))\right) \right]$$

where:
  $K_n$ is a scaling factor for the receiver of index n; by default this scaling factor can be set to one; and
  Op is a waveform operator applicable to an input waveform (e.g. AIC, BIC, STALTA).

In view of the above notations, $$Op_{wf_R^{E_j}}\left(TT_{s_m^{E_j}}(T(d), R(d_n))\right)$$

is the operator output for the preprocessed waveform $wf_R^{E_j}$ and for the candidate travel time $$TT_{s_m^{E_j}}(T(d), R(d_n)),$$

i.e.

$$Op_{wf_R^{E_j}}\left(TT_{s_m^{E_j}}(T(d), R(d_n))\right)$$

is the travel time relevance indicator, based on the waveform operator Op, of the candidate travel time $$TT_{s_m^{E_j}}(T(d), R(d_n))$$

corresponding to the receiver $R(d_n)$ at a position $d_n$.

Similarly $CSM_{Op}(s_m^{E_1}, s_m^{E_2}, \ldots, s_m^{E_P})$ is the model relevance indicator, based on the waveform operator Op, of the slowness model Sm for energy modes $E_1$ to $E_P$.

When choosing STALTA as the waveform operator, we obtain the expression of $CSM_{STALTA}$ as given by equation (eq3).

$$CSM_{STALTA}(s_m^{E_1}, s_m^{E_2}, \ldots, s_m^{E_P}) = \qquad (eq3)$$

$$\sum_n K_n \cdot \left[ \prod_{j=1}^P STALTA_{wf_n^{E_j}}\left(TT_{s_m^{E_j}}(T(d), R(d_n))\right) \right]$$

Likewise, when choosing AIC as the waveform operator for CSM, we obtain the expression of $CSM_{AIC}$ as given by equation (eq4).

$$CSM_{AIC}(s_m^{E_1}, s_m^{E_2}, \ldots, s_m^{E_P}) = \qquad (eq4)$$

-continued $$\sum_n K_n \cdot \left[ \prod_{j=1}^P AIC_{wf_n^{E_j}}\left(TT_{s_m^{E_j}}(T(d), R(d_n))\right) \right]$$

In one or more embodiment, the objective function is called the GSTC function (GSTC, for General Slowness Time Coherence) and is defined by equation (eq5) below:

$$GSTC_{Op}(s_m^{E_1}, s_m^{E_2}, \ldots, s_m^{E_P}) = \qquad (eq5)$$

$$\prod_{j=1}^P \frac{\int_{t=0}^{\tau=T_w} \left[\sum_n wf_n^{E_j}\left(t + TT_{s_m^{E_j}}(T(d), R(d_n))\right)\right]^2 \cdot dt}{N \cdot \sum_n \int_{t=0}^{\tau=T_w} \left[wf_n^{E_j}\left(t + TT_{s_m^{E_j}}(T(d), R(d_n))\right)\right]^2 \cdot dt}$$

Where:
  $T_w$ is a window length used to extract a portion of the waveforms.

As it comes out from equation (eq6) below, the GSTC function would be equivalent to the STC operator under the additional following conditions:
  p is equal to one;
  All the receivers are regularly spaced in the sonic tool;
  A refraction model is used in the ray-tracing of the forward modelling;
  A constant slowness model value is assumed for the borehole portion where the selected receivers are located.

$$STC_{Operator}(s_m) = \frac{\int_{t=0}^{\tau=T_w} \left[\sum_R wf_R^{E_j}(t + s_m \cdot (d - d_R))\right]^2 \cdot dt}{N \cdot \sum_R \int_{t=0}^{\tau=T_w} \left[wf_R^{E_j}(t + s_m \cdot (d - d_R))\right]^2 \cdot dt} \qquad (eq6)$$

With the objective functions defined therein it is no more a constraint to have a constant spacing between the receivers of a logging tool. There is also no constraint as to the wave propagation mode as different propagation modes may be considered simultaneously. Moreover, the objective function works also with any kind of slowness model, therefore even if there is no constant slowness in the borehole portion where the selected receivers are located. In addition, the different arrival times of different energy modes may be considered simultaneously in order to reduce the risk of false travel time computation. For example, considering jointly the arrival of P-waves, S-waves and Stoneley-waves reduces the risk of erroneous detection of P-wave arrival. The objective function may also operate on a global analysis of the waveforms recorded by the receivers rather than on a single waveform basis.

Referring back to FIG. 7B, at block 860, a model relevance indicator is computed for each slowness model from the set of waveforms (whether preprocessed or not) recorded by one or more receivers of the logging tool.

At block 870, a search for the relevance indicator which is optimum is performed based on the model relevance indicators computed at block 860.

At block 880, the set of candidate travel times corresponding to the slowness model for which the objective function is optimum, (e.g. the slowness model for which the model relevance indicator is maximum), are obtained from the search performed at block 870. The objective function is optimum for example when the output value of the objective function reaches a maximum, a minimum or verify a given optimality criteria for a set of candidate travel times corresponding to a slowness model. The candidate travel times corresponding to the slowness model for which the objective function is optimum are referred to therein as the "matching travel times".

Figure 8:
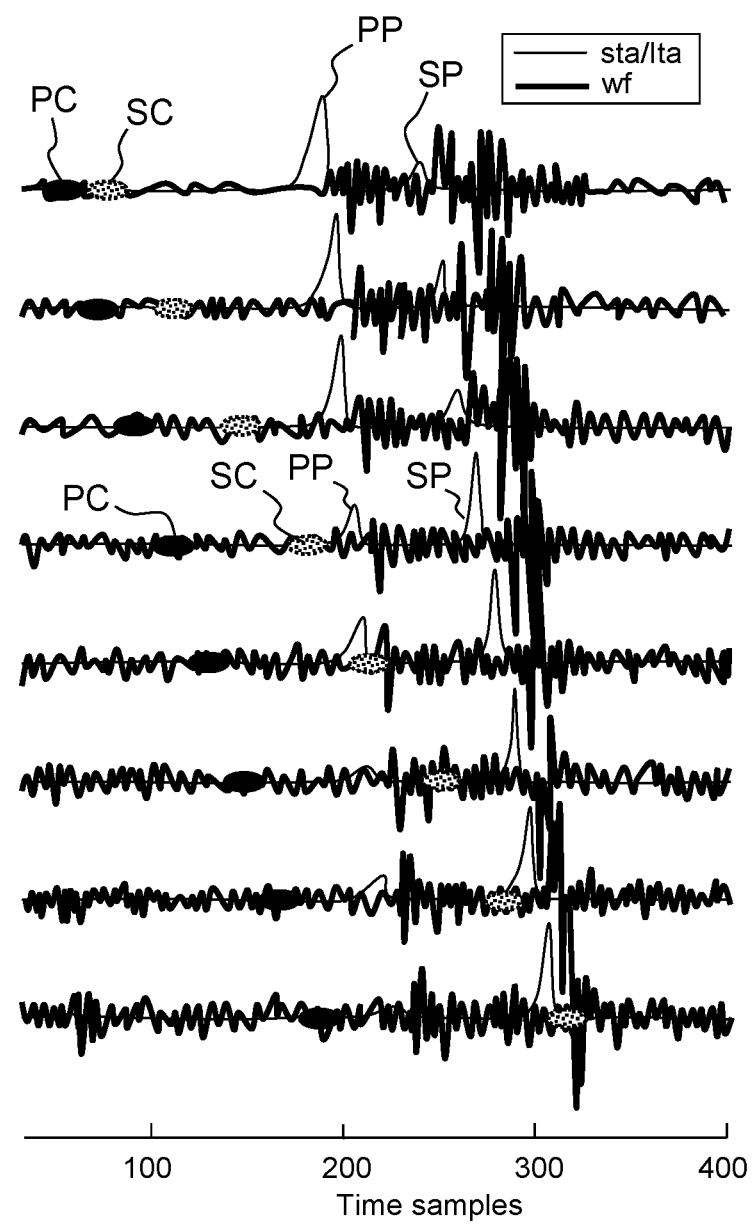
FIG. 8 illustrates some aspects of the processing of sonic waveforms.

At block 885, a time-picking algorithm may be used to compare the matching travel times with travel times determined on a single waveform basis with a given waveform operator applied directly to a recorded waveform (without forward modelling). FIG. 8 illustrates the principles of the time-picking using the STALTA operator.

FIG. 8 shows example input waveforms together with the associated STALTA output curves. The output of the STALTA waveform operator may include peaks (maximum values) corresponding to the best candidate travel times for P-waves (PP) and S-waves (SP) respectively. A set of candidate arrival times obtained at block 650 as the result of the forward modelling are also represented, both for the P-waves (circles PC) and for the S-waves (circles SC). A maximum of the objective function is achieved for the most relevant or optimum slowness model and the matching travel times would in this example match those generated by the STALTA operator. FIG. 8 illustrates the situation of non-matching travel times for the purpose of illustration.

By applying locally a time-picking refining approach based on a waveform operator (STALTA, AIC or BIC) that operates on a single waveform basis, the results obtained at block 880 may thus be evaluated. In some embodiments, time delay techniques can be used to refine the time-picks.

The forward modelling and the operations of blocks 830 to 880 or 830 to 885 may be performed several times before the operations of block 890 are performed.

At block 890, one or more slowness estimate is obtained for the subterranean formation on the basis of the matching travel times. A slowness estimate is one of the slowness values of a geological cells of the most relevant slowness model or a combination of these slowness values. The slowness estimate may be computed for one or more energy mode. A slowness map may be generated and displayed on a screen of a device. A slowness map represents relevance indicators of slowness values computed for a given energy mode at different depths with a given function. The given function may be an objective function described therein or a waveform operator.

Figure 9:
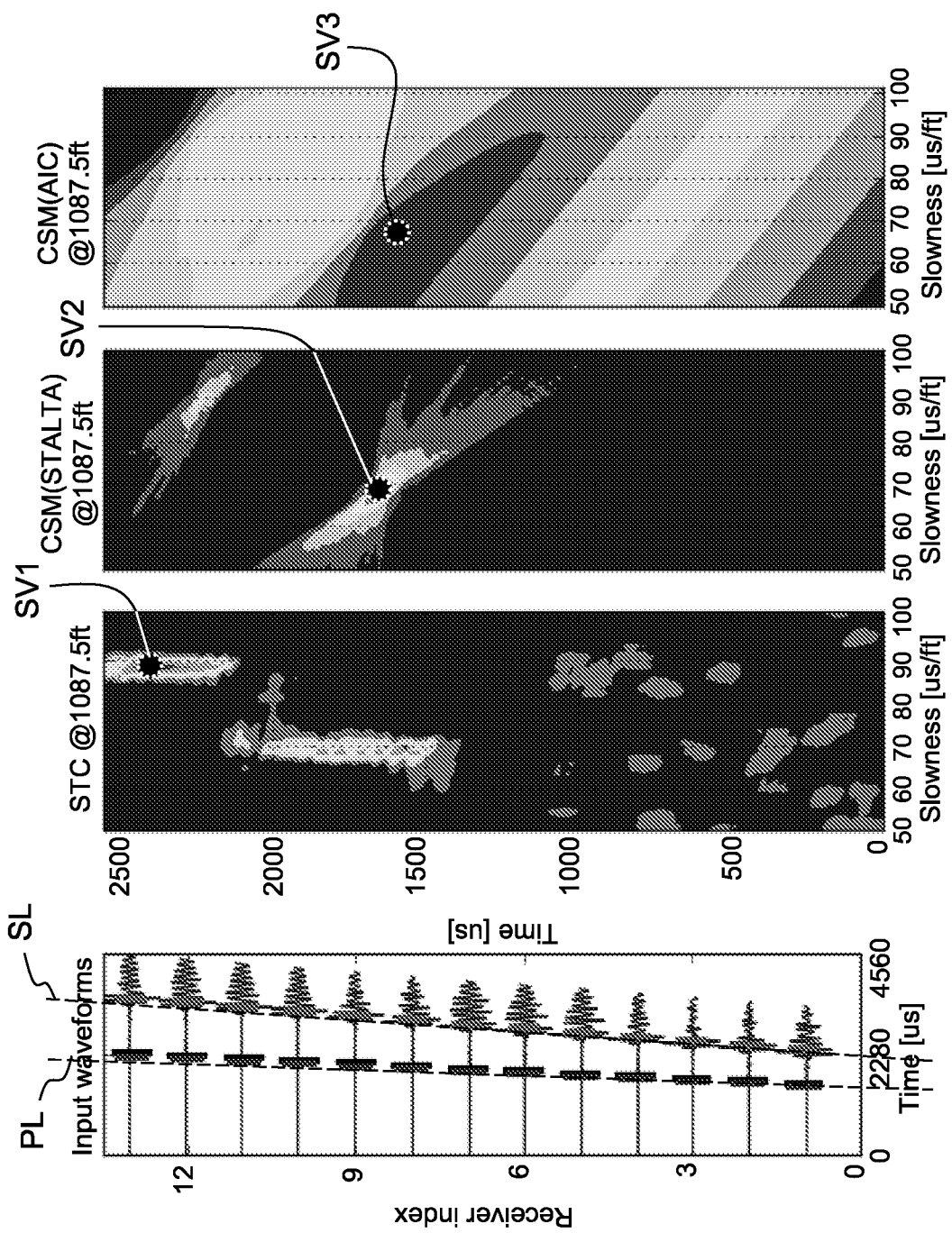
FIG. 9 illustrates some aspects of the processing of sonic waveforms.
Figure 10:
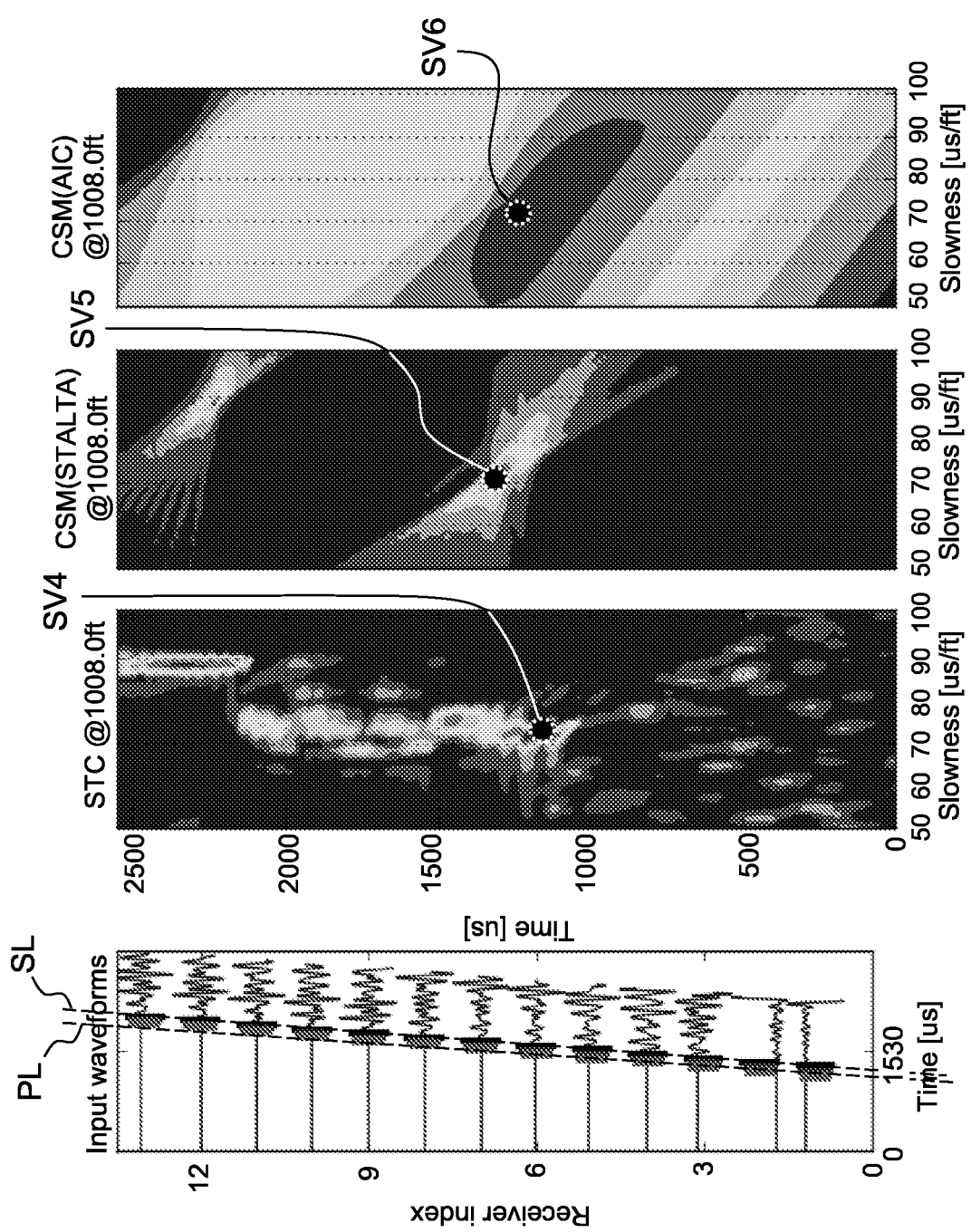
FIG. 10 illustrates some aspects of the processing of sonic waveforms.

FIGS. 9 and 10 show examples of slowness maps resulting from the processing of the waveforms acquired by an acoustic tool with an array of 13 receivers in two different situations. In order to be able to compare the output of different functions, the processing has been performed under the following conditions: the slowness is assumed to be constant over the area covered by the logging tool; the receivers are regularly spaced so that the STC method can be used as a reference method; the travel time between the transmitter and the nearest receiver is measured.

These two FIGS. 9 and 10 are made of four panels. Panel 1, on the left, displays the waveforms recorded by the receivers with the associated estimated arrival-times. On this panel a straight line PL or SL may be drawn between the arrival times of the P-wave or respectively the S-waves, and this straight line intersects with the horizontal axis. This straight line illustrates the linear relationship that exists between the depth (or receiver position) and the corresponding travel time when the slowness is uniform in the borehole. Panel 2 shows a slowness map according to the STC output for P-waves. Panel 3 shows a slowness map according to the $CSM_{STALTA}$ output for P-waves. Panel 4, on the right, shows a slowness map according to the $CSM_{AIC}$ output for P-waves. The grey level of a point of these slowness maps is representative of the relevance of the slowness value at the corresponding depth/time value. In each panels 2 to 4 a dark circle SV1, SV2, SV3 or respectively SV4, SV5, SV6 is represented that corresponds to the higher relevance indicator corresponding to the most relevant slowness value at the corresponding depth.

FIG. 9 shows that both $CS_{STALTA}$ and $CSM_{AIC}$ estimate the adequate P-waves slowness (SV2, SV3). Instead, STC is subject to a cycle skipping effect and returns the S-waves slowness value (SV1).

FIG. 10 shows that the three tested methods provide comparable P-waves slowness estimates (SV4, SV5, SV6). It is, however, clear that the STC map is much more subject to false alarms (much more noisy and irregular) than the two other $CSM_{STALTA}$ map or the $CSM_{AIC}$ map.

A sonic slowness estimation algorithm has been described. The described algorithm may be used to process the data of acoustic logging tools with any receiver configuration, i.e. no restriction is needed for the acoustic receivers to be regularly spaced.

The method for estimating sonic slowness described therein may be used for monopole data, dipole data acquired with wireline sonic tools or with Logging While Drilling (LWD) sonic tools. Thanks to its flexibility, the described method may be applied to sonic tools regardless of their receiver configuration. More specifically there is no constraint about having a constant receiver spacing in the data acquisition tool.

Thanks to the non-linear Radon transform, the slowness estimation method described therein combines the use of information criteria such as STALTA, AIC or BIC with forward modelling based on ray-tracing, in order to get the best match between model and observed data on a shot gather basis. Additionally, the method allows for the joint detection of several energy modes.

The method generates travel times from several slowness models for the subterranean formation thus ensuring that the computed travel times are consistent with a slowness model, and therefore consistent one with each other's. This provides a more robust approach for estimating sonic slowness, with less false detections of arrival times. A reduction of user intervention on the computed travel times or slownesses may be achieved.

The slowness estimation method described therein is applicable both to in-field and post-processing of sonic logging data.

Although the preceding description has been done herein with reference to particular means, materials, and embodiments, it is not intended to be limited to the particular disclosed herein. By way of further example, embodiments may be utilized in conjunction with a handheld system (i.e., a phone, wrist or forearm mounted computer, tablet, or other handheld device), portable system (i.e., a laptop or portable computing system), a fixed computing system (i.e., a desktop, server, cluster, or high performance computing system), or across a network (i.e., a cloud-based system). As such, embodiments extend to functionally equivalent structures, methods, uses, program products, and compositions as are within the scope of the appended claims.

The invention claimed is:

1. A method for estimating sonic slowness in a subterranean formation, comprising:

obtaining a plurality of sonic waveforms received by a plurality of receivers after emission of a source sonic wave by a transmitter through the subterranean formation to obtain a plurality of recorded sonic waveforms, the plurality of receivers located at different positions in the subterranean formation;

obtaining at least two slowness models of the subterranean formation, a slowness model being defined by at least one cell of constant slowness for at least one wave energy mode;

computing, for each slowness model, a set of candidate travel times, each candidate travel time of a set of candidate travel times being computed for one said wave energy mode and a position of the transmitter and a position of a receiver in the plurality of receivers;

computing a relevance indicator for each set of candidate travel times based on the recorded sonic waveforms by extracting from at least one of the recorded sonic waveforms at least two wave components corresponding respectively to at least two wave energy modes and computing the relevance indicator for the corresponding set of candidate travel times by numerically combining operator output values corresponding to the at least two wave energy modes;

searching a match between the sets of candidate travel times and the recorded sonic waveforms by searching the relevance indicators for a relevance indicator that is optimum; and computing a sonic slowness estimate for the subterranean formation from a set of candidate travel times for which the relevance indicator is optimum.

2. The method according to claim 1, wherein each of the operator output values is computed by applying at least one waveform operator to a recorded sonic waveform received by the receiver at a position corresponding to one of the candidate travel times, the operator output value being indicative of a relevance of the one of the candidate travel times.

3. The method according to claim 2, further comprising:
preprocessing each recorded sonic waveform to extract at least one wave component corresponding to a wave energy mode; and
computing each of the operator output values for each of the candidate travel times corresponding to a given energy mode by applying the waveform operator to the extracted wave component corresponding to the given energy mode.

4. The method according to claim 3, wherein each set of candidate travel times comprises, for each position of a receiver in the subterranean formation, at least two candidate travel times corresponding to two respective distinct wave energy modes.

5. The method according to claim 4, wherein the preprocessing of each recorded sonic waveform is performed to extract from each recorded sonic waveform the at least two wave components corresponding respectively to the at least two wave energy modes.

6. The method according to claim 2, wherein each of the operator output values is computed from a portion of the recorded sonic waveform corresponding to a temporal window defined relatively to a given candidate travel time.

7. The method according to claim 1, wherein each set of candidate travel times comprises, for each wave energy mode, at least two candidate travel times corresponding to at least two respective distinct positions of a receiver in the subterranean formation.

8. The method according to claim 1, comprising utilizing a waveform operator to compute operator output values wherein the wavefrom operator is based on a criterion selected from the group consisting of the Akaike Information Criterion (AIC), the Bayes Information Criterion (BIC) and the Short Term Average/Long Term Average (STALTA).

9. The method according to claim 1, wherein each of the wave energy modes represents an energy mode corresponding to a wave component selected from the group consisting of a compressional wave component, a shear wave component, a Stoneley wave component, a Rayleigh wave component, and a mud wave component.

10. The method of claim 1, wherein the plurality of receivers and the transmitter are arranged along a logging tool.

11. The method of claim 10, wherein each of the plurality of receivers comprises an axial position along the logging tool, wherein the axial positions differ.

12. The method of claim 1, wherein the slowness model comprises geological cells.

13. The method of claim 12, wherein the slowness model models a wave emitted by a transmitter position as propagating through one or more of the geological cells.

14. The method of claim 13, wherein the slowness model models the wave as being at least one of reflected back by a wall of a borehole at a geological cell level and propagated along the wall of the borehole at a geological cell interface and out of one or more of the geological cells before reaching a receiver position of one of the plurality of receivers.

15. The method of claim 1, wherein the slowness model comprises geological cells arranged in layers.

16. The method of claim 15, wherein at least one of the layers comprises at least two geological cells.

17. A computing system comprising:
one or more processors for processing data; and
one or more memories operatively coupled to the one or more processors that comprise program instructions for causing said one or more processors to perform a method for estimating sonic slowness that comprises:
obtaining a plurality of sonic waveforms received by a plurality of receivers after emission of a source sonic wave by a transmitter through the subterranean formation to obtain a plurality of recorded sonic waveforms, the plurality of receivers located at different positions in the subterranean formation;
obtaining at least two slowness models of the subterranean formation, a slowness model being defined by at least one cell of constant slowness for at least one wave energy mode;
computing, for each slowness model, a set of candidate travel times, each candidate travel time of a set of candidate travel times being computed for one said wave energy mode and a position of the transmitter and a position of a receiver in the plurality of receivers;
computing a relevance indicator for each set of candidate travel times based on the recorded sonic waveforms by extracting from at least one of the recorded sonic waveforms at least two wave components corresponding respectively to at least two wave energy modes and computing the relevance indicator for the corresponding set of candidate travel times by numerically combining operator output values corresponding to the at least two wave energy modes;
searching a match between the sets of candidate travel times and the recorded sonic waveforms by searching the relevance indicators for a relevance indicator that is optimum; and computing a sonic slowness estimate for the subterranean formation from a set of candidate travel times for which the relevance indicator is optimum.

18. One or more non-transitory computer-readable media comprising processor-executable instructions executable to cause a computing system to:

obtain a plurality of sonic waveforms received by a plurality of receivers after emission of a source sonic wave by a transmitter through the subterranean formation to obtain a plurality of recorded sonic waveforms, the plurality of receivers located at different positions in the subterranean formation;

obtain at least two slowness models of the subterranean formation, a slowness model being defined by at least one cell of constant slowness for at least one wave energy mode;

compute, for each slowness model, a set of candidate travel times, each candidate travel time of a set of candidate travel times being computed for one said wave energy mode and a position of the transmitter and a position of a receiver in the plurality of receivers;

compute a relevance indicator for each set of candidate travel times based on the recorded sonic waveforms by extracting from at least one of the recorded sonic waveforms at least two wave components corresponding respectively to at least two wave energy modes and computing the relevance indicator for the corresponding set of candidate travel times by numerically combining operator output values corresponding to the at least two wave energy modes;

search a match between the sets of candidate travel times and the recorded sonic waveforms by searching the relevance indicators for a relevance indicator that is optimum; and compute a sonic slowness estimate for the subterranean formation from a set of candidate travel times for which the relevance indicator is optimum.

* * * * *